United States Patent [19]

Matsumura

[11] Patent Number: 5,666,571
[45] Date of Patent: Sep. 9, 1997

[54] AUTOMATIC EMISSION DEVICE SUITABLE FOR USE AS LIGHT SOURCE, SUCH AS FLASH UNIT

[75] Inventor: Koichi Matsumura, Kanagawa-ken, Japan

[73] Assignee: Canon Kabushiki Kaisha, Tokyo, Japan

[21] Appl. No.: 230,493

[22] Filed: Apr. 20, 1994

[30] Foreign Application Priority Data

Apr. 22, 1993 [JP] Japan ................... 5-117636

[51] Int. Cl.⁶ .......................................... G03B 7/00
[52] U.S. Cl. .................................................. 396/165
[58] Field of Search .......................... 354/419, 430; 396/155, 165, 166, 168, 169, 170, 225

[56] References Cited

U.S. PATENT DOCUMENTS

| | | | |
|---|---|---|---|
| 4,827,119 | 5/1989 | Gaboury | 250/214 R |
| 5,109,248 | 4/1992 | Petrakos et al. | 354/413 |
| 5,128,708 | 7/1992 | Murayama et al. | 354/430 |
| 5,406,348 | 4/1995 | Wheeler | 396/166 |

FOREIGN PATENT DOCUMENTS 0424987   2/1991   European Pat. Off. .

*Primary Examiner*—Howard B. Blankenship
*Attorney, Agent, or Firm*—Robin, Blecker, Daley and Driscoll

[57] ABSTRACT

The present invention relates to an automatic flash emission device suitable for use as, for example, an automatic flash emission device for a camera. The present invention is to provide an arrangement for detecting the kind of light source which illuminates a scene which is to be photographed (for example, whether tungsten light or a fluorescent lamp), and shifting the threshold of a subject luminance beyond which a flash device performs an automatic emission, thereby enabling the flash device to perform the automatic emission in a form conforming to the kind of light source.

46 Claims, 2 Drawing Sheets

AUTOMATIC EMISSION DEVICE SUITABLE FOR USE AS LIGHT SOURCE, SUCH AS FLASH UNIT

BACKGROUND OF THE INVENTION

1. Field of the Invention

The present invention relates to an automatic emission device suitable for use as an emission light source, such as a flash unit, which is provided with the function of detecting the kind of light source which illuminates a subject.

2. Description of the Related Art

It has heretofore been known that some cameras have a so-called automatic flash emission function which serves to measure a subject luminance (the luminance of external light), make a comparison between the subject luminance and a predetermined value, and, if the subject luminance is lower than the predetermined value, execute emission of flash light, thereby effecting flash photography.

However, if whether flash light is to be employed is primarily determined on the basis of the comparison between the subject luminance and the predetermined value, the following problems will be encountered.

(i) During photography performed in a photographic environment illuminated with a fluorescent lamp, if it is determined that the subject luminance is not less than the predetermined value, and no flash unit emits light, a photograph will be greenish by the influence of the bright line spectrum of the fluorescent lamp.

(ii) During photography performed in a photographic environment illuminated with tungsten light, even if the subject luminance is less than the predetermined value, it is in many cases possible to obtain an atmospheric photograph of warm color tone by performing photography using no flash unit. In other words, if a flash unit is used in a photographic environment illuminated with tungsten light, the contrast between the subject and the background becomes high and, in many cases, a photograph which utterly differs from the atmosphere of that scene will be obtained.

(iii) An arrangement having the function of making a decision as to whether a light source is a fluorescent lamp or tungsten light, that is, the function of detecting the kind of light source, is previously disclosed in Japanese Laid-Open Patent Application No. Hei 3-163538. However, in the light of the problem (ii), it may be considered to provide a camera which has the aforesaid function so that if a user knows that a light source is tungsten light, the user can perform the operation of disabling a flash unit from emitting flash light. However, not only is such an operation complicated, but also if the user is not skilled in photography to any extent, he will not be able to easily determine whether the emission of the flash unit is to be disabled.

SUMMARY OF THE INVENTION

An object of the present invention is to provide a a device capable of performing switching between the operational conditions of emission control or the like of an emission light source in accordance with the kind of light source.

Another object of the present invention is to provide a flash unit or a camera having an automatic flash emission function which at any time enables a user to take a photograph in which the atmosphere of a scene is impressively reproduced irrespective of the kind of light source, without performing a complicated operation.

To achieve the above objects, in accordance with one aspect of the present invention, there is provided an arrangement which comprises light-source detecting means for detecting the kind of light source which illuminates a subject, and low-luminance decision value setting means for varying a low-luminance decision value in automatic flash emission means on the basis of the kind of light source detected by the light-source detecting means, whereby the low-luminance decision value in the automatic flash emission means can be varied on the basis of the detected kind of light source.

In accordance with another aspect of the present invention, there is provided an arrangement which comprises light-source detecting means for detecting the kind of light source which illuminates a subject, and disabling means for disabling the operation of automatic flash emission means if the light-source detecting means detects a particular kind of light source, whereby the operation of the automatic flash emission means is disabled if the detected kind of light source is the particular kind.

The above and other objects of the present invention will become apparent from the following detailed description of preferred embodiments of the present invention, taken in conjunction with the accompanying drawings.

DETAILED DESCRIPTION OF THE PREFERRED EMBODIMENTS

Embodiments of the present invention will be described below in detail with reference to the accompanying drawings.

Figure 1:
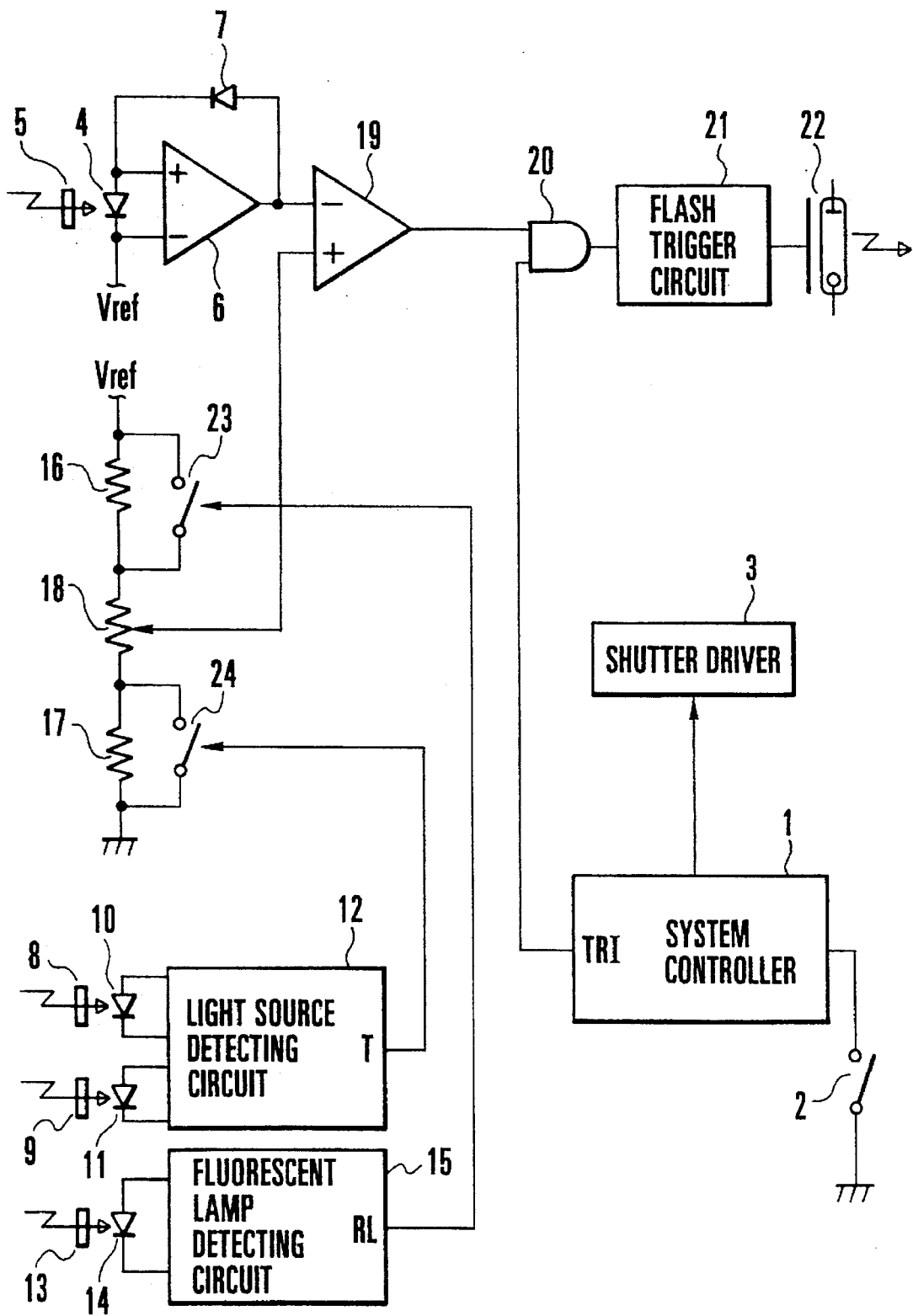
FIG. 1 is a block diagram schematically showing the essential arrangement of a camera provided with an automatic flash emission function according to a first embodiment of the present invention.

FIG. 1 is a block diagram schematically showing the essential arrangement of a camera provided with an automatic flash emission function according to a first embodiment of the present invention.

The arrangement shown in FIG. 1 includes a system controller 1 for executing sequence control of a camera, a release switch 2 for initiating a film exposure operation, a shutter driver 3 for executing opening and closing control of a shutter (not shown), a light measuring photodiode 4 for detecting the brightness of an area to be photographed, a visible-light transmission filter 5 for transmitting only visible light, an operational amplifier 6, a diode 7 for logarithmic compression, band-pass filters 8 and 9 each having a predetermined wavelength transmission characteristic, photodiodes 10 and 11, a light source detecting circuit 12 for detecting whether the current light source is tungsten light on the basis of the output ratio of the photodiode 10 to the photodiode 11, a band-pass filter 13 for transmitting only light of wavelength which corresponds to a bright line spectrum of a fluorescent lamp, a photodiode 14, and a fluorescent lamp detecting circuit 15 for detecting whether the current light source is a fluorescent lamp. The shown arrangement also includes resistors 16 and 17, and one terminal of the resistor 16 is coupled to a predetermined voltage (Vref) and one terminal of the resistor 17 is grounded. A variable resistor 18 is connected to the other terminals of the respective resistors 16 and 17.

The shown arrangement also includes a low-luminance detecting comparator 19, and the output of the variable resistor 18 which is a low-luminance decision voltage is applied to the non-inverting input terminal of the comparator 19, while the output of the light measurement operational amplifier 6 is applied to the inverting input terminal of the comparator 19. The shown arrangement also includes an AND gate 20, a flash trigger circuit 21, a xenon tube 22 which is a flash discharge tube, a switch 23 which is placed under the on/off control of the fluorescent lamp detecting circuit 15 and is arranged to form a short circuit across the resistor 16 when turned on, and a switch 24 which is placed under the on/off control of the light source detecting circuit 12 and is arranged to form a short circuit across the resistor 17 when turned on.

The operation of the above-described arrangement will be described below.

When the release switch 2 is turned on, the system controller 1 initiates a photographic sequence. Since the photographic sequence is not an essential feature of the first embodiment, description of the photographic sequence is omitted herein. The shutter (not shown) is opened at a predetermined time by the shutter driver 3 so that correct exposure of the film can be effected. During this time, the system controller 1 outputs a flash emission trigger signal from a terminal TRI. The flash emission trigger signal is applied to one input terminal of the AND gate 20. At this time, if a high-level signal is applied to the other input terminal of the AND gate 20, the xenon tube 22 is activated by the flash trigger circuit 21, thereby emitting flash light.

Since a signal from the low-luminance detecting comparator 19 is applied to the other input terminal of the AND gate 20, only if the output voltage value of the light measurement operational amplifier 6 which is applied to the inverting input terminal of the comparator 19 is lower than the value of a low-luminance decision voltage applied to the non-inverting input terminal of the comparator 19, a trigger signal is transmitted to the flash trigger circuit 21. In other words, only if a subject luminance is lower than a predetermined luminance, the xenon tube 22 is operated to emit light.

The low-luminance decision voltage applied to the low-luminance detecting comparator 19 will be described below.

If the fluorescent lamp detecting circuit 15 detects that the current light source is a fluorescent lamp, and a high-level signal is outputted from a terminal RL of the fluorescent lamp detecting circuit 15, the switch 23 is turned on and a short circuit is formed across the resistor 16. The center output voltage of the variable resistor 18 rises and the low-luminance decision voltage applied to the non-inverting input terminal of the low-luminance detecting comparator 19 becomes higher. Thus, a flash emission luminance level is made high with respect to the flash emission luminance level which is used when the light source is not a fluorescent lamp, whereby the opportunities to emit flash light are increased.

If the light source detecting circuit 12 detects that the current light source is tungsten light, a high-level signal is outputted from a terminal T of the light source detecting circuit 12, so that the switch 24 is turned on and a short circuit is formed across the resistor 17. The low-luminance decision voltage which is applied to the non-inverting input terminal of the low-luminance detecting comparator 19 becomes lower. Thus, the flash emission luminance level is made low with respect to the flash emission luminance level which is used when the light source is not tungsten light (for example, in the case of a fluorescent lamp or light sources other than tungsten light).

If the current light source is neither a fluorescent lamp nor tungsten light (for example, in the case of natural light), both of the switches 23 and 24 are off, so that the flash emission luminance level is set to an intermediate value between the flash emission luminance level for the fluorescent lamp and the flash emission luminance level for the tungsten light.

A method of detecting the kind of light source will be described below in brief.

The fluorescent lamp detecting circuit 15 can detect whether the current light source is a fluorescent light source by determining whether the bright line spectrum of the fluorescent lamp transmitted by the fluorescent lamp luminance band-pass filter 13 is not less than a predetermined value and by determining whether the flicker frequency of the output of the band-pass filter 13 is present in the band of approximately 50–120 Hz.

The light source detecting circuit 12 can detect whether the current light source is tungsten light by determining whether the color temperature of the light source is not greater than a predetermined value on the basis of the output ratio of the photodiode 10 to the photodiode 11.

Needless to say, the characteristics of the band-pass filters 8, 9 and 13 are selected so that the respective band-pass filters 8, 9 and 13 can transmit only spectra of predetermined wavelengths.

Figure 2:
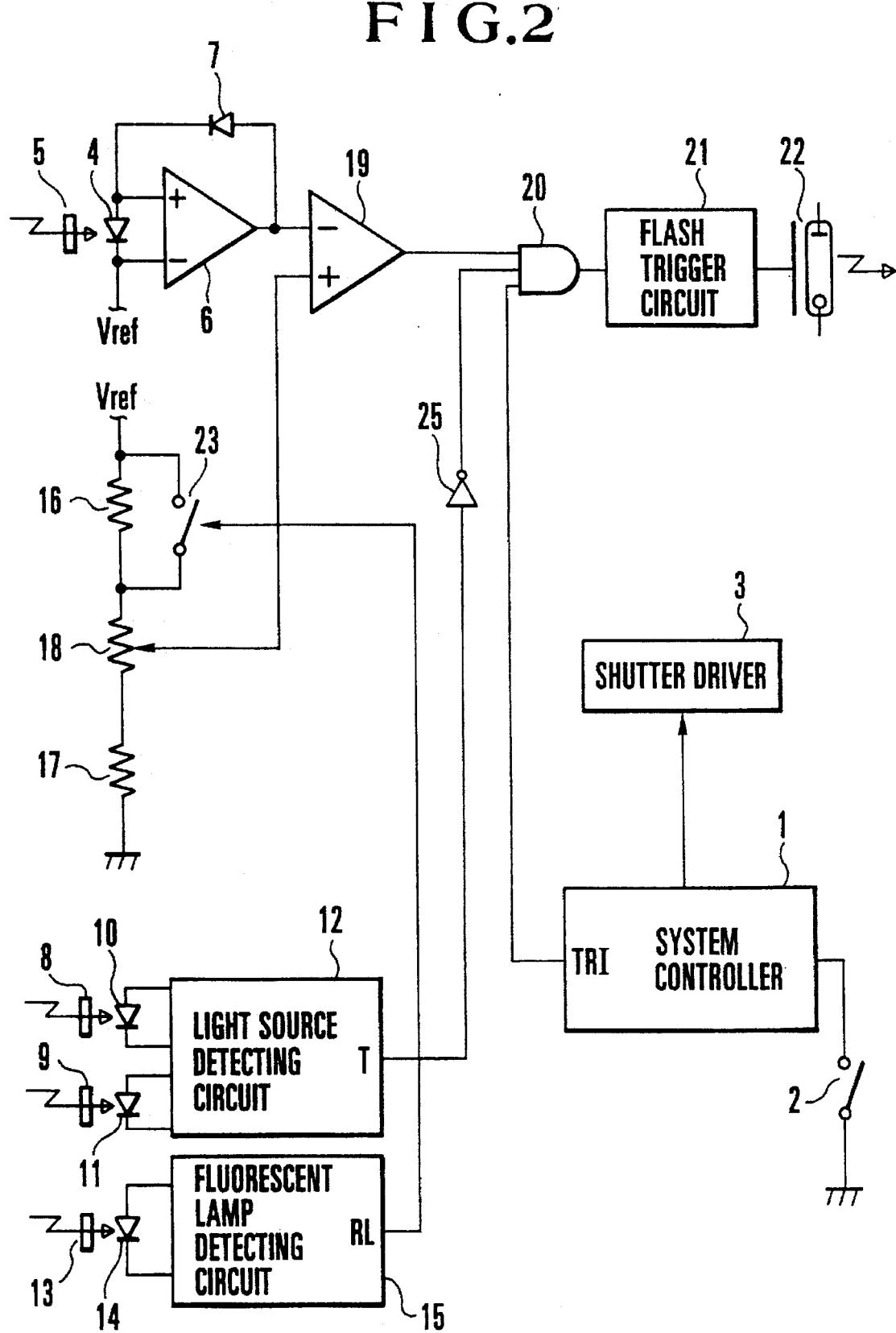
FIG. 2 is a block diagram schematically showing the essential arrangement of a camera provided with an automatic flash emission function according to a second embodiment of the present invention.

FIG. 2 is a block diagram schematically showing the essential arrangement of a camera according to a second embodiment of the present invention. In FIG. 2, the same reference numerals are used to denote parts which correspond to those shown in FIG. 1.

The second embodiment is arranged to disable flash emission if a predetermined light source (tungsten light) is detected. To realize this arrangement, an element having three inputs is used as the AND gate 20, and an inverter 25 for inverting a signal outputted from the terminal T of the light source detecting circuit 12 is connected to one input terminal of the AND gate 20.

In such an arrangement, if the light source detecting circuit 12 detects that the current light source is tungsten light, a high-level signal is outputted from the terminal T, and the output of the inverter 25 is inverted to a low level. Accordingly, even if the other two input terminals of the AND gate 20 are both at high levels, the supply of a trigger signal from the AND gate 20 to the flash trigger circuit 21 is disabled.

According to either of the above-described embodiments, during photography performed in a photographic environment illuminated with a fluorescent lamp, since the flash emission luminance level is made higher, it is possible to increase the opportunities to obtain a photograph of natural colors which is free from greenish discoloration owing to an emission of flash light.

During photography performed in a photographic environment illuminated with tungsten light, the flash emission luminance level is made lower so that the opportunities to emit flash light are decreased or completely disabled. Accordingly, it is possible to take an atmospheric photograph of warm color tone without a complicated operation.

Further, since the aforesaid decision as to the kind of light source and the aforesaid control for such a decision are automatically performed by the camera, even a beginner having no knowledge of photography can perform ideal photography at any time.

Although either of the above-described embodiments has been applied to a camera by way of example, the present invention can be applied to all kinds of devices intended for automatic emission that are suitable for use as emission light sources.

What is claimed is:

1. An automatic emission device comprising:
   a) light-source discriminating means for discriminating a kind of an artificial light source by examining an ambient light;
   b) a control circuit for detecting a characteristic value of the ambient light and, if the detected characteristic value is a predetermined value, enabling operation of an emission light source; and
   c) setting means for adjusting the predetermined value on the basis of which said control means enables the operation of the emission light source, in accordance with a kind of the artificial light source discriminated by said light-source discriminating means.

2. An automatic emission device according to claim 1, wherein the characteristic value is a luminance value.

3. An automatic emission device according to claim 2, wherein the emission light source is flash means.

4. An automatic emission device comprising:
   a) light-source discriminating means for discriminating a kind of an ambient light source by examining an ambient light;
   b) a control circuit for detecting a luminance value of the ambient light and, if the detected luminance value is a predetermined value, enabling operation of an emission light source; and
   c) disabling means for disabling the operation of the emission light source on the basis of a result of the discrimination made by said light-source discriminating means irrespective of the detected luminance value of the ambient light.

5. An automatic emission device according to claim 4, wherein the characteristic value is a luminance value.

6. An automatic emission device according to claim 5, wherein the emission light source is flash means.

7. A device for causing flash means to automatically operate, comprising:
   a) light-source discriminating means for discriminating a kind of an artificial light source by examining an ambient light;
   b) a control circuit for detecting a luminance value of an object and, if the luminance value is lower than a predetermined value, enabling an emission of the flash means; and
   c) adjusting means for adjusting the predetermined value on the basis of which said control circuit enables the emission of the flash means, in accordance with a kind of the artificial light source discriminated by said light-source discriminating means.

8. A device according to claim 7, wherein if said light-source discriminating means determines that the artificial light source is a light source having a first characteristic, said adjusting means sets the predetermined value to a high value with respect to a value which is set when the artificial light source is a light source other than the light source having the first characteristic.

9. A device according to claim 7, wherein if said light-source discriminating means determines that the artificial light source is a light source having a second characteristic, said adjusting means sets the predetermined value to a low value with respect to a value which is set when the artificial light source is a light source other than the light source having the second characteristic.

10. A device according to claim 8, wherein the artificial light source having the first characteristic is a fluorescent lamp.

11. A device according to claim 9, wherein the artificial light source having the second characteristic is a tungsten light source.

12. A device for causing flash means to automatically operate, comprising:
   a) light-source discriminating means for discriminating a kind of an ambient light source by examining an ambient light;
   b) a control circuit for detecting a luminance value of an object and, if the luminance value is lower than a predetermined value, enabling an emission of the flash means;
   c) disabling means for disabling the flash means from operating, on the basis of a result of the discrimination made by said light-source discriminating means irrespective of the luminance value of the object.

13. A device according to claim 12, wherein if said light-source discriminating means determines that the ambient light source is a light source having a first characteristic, said disabling means disables the flash means from operating.

14. A device according to claim 13, wherein the light source having the first characteristic is a tungsten light source.

15. A device according to claim 12, further comprising adjusting means for adjusting, in accordance with a result of the discrimination made by said light-source discriminating means, the predetermined value on the basis of which said control means enables the emission of the flash means.

16. A device according to claim 13, further comprising adjusting means for setting, if said light-source discriminating means determines that the ambient light source is a light source having a second characteristic, the predetermined value to a high value with respect to a value which is set when the ambient light source is a light source other than the light source having the second characteristic.

17. A device according to claim 16, wherein the light source having the first characteristic is a tungsten light source, while the light source having the second characteristic is a fluorescent lamp.

18. A device according to claim 1, wherein if said light-source discriminating means determines that the artificial light source is a light source having a first characteristic, said adjusting means sets the predetermined value to a high value with respect to a value which is set when the artificial light source is a light source other than the light source having the first characteristic.

19. A device according to claim 1, wherein if said light-source discriminating means determines that the artificial light source is a light source having a second characteristic, said adjusting means sets the predetermined value to a low value with respect to a value which is set when the artificial light source is a light source other than the light source having the second characteristic.

20. A device according to claim 18, wherein the artificial light source having the first characteristic is a fluorescent lamp.

21. A device according to claim 19, wherein the artificial light source having the second characteristic is a tungsten light source.

22. An automatic emission device according to claim 4, wherein if said light-source discriminating means determines that the ambient light source is a light source having a first characteristic, said disabling means disables the operation of the emission light source.

23. An automatic emission device according to claim 22, wherein the light source having the first characteristic is a tungsten light source.

24. An automatic emission device according to claim 22, further comprising adjusting means for setting, if said light-source discriminating means determines that the ambient light source is a light source having a second characteristic, the predetermined value to a high value with respect to a value which is set when the ambient light source is a light source other than the light source having the second characteristic.

25. An automatic emission device according to claim 24, wherein the light source having the first characteristic is a tungsten light source, while the light source having the second characteristic is a fluorescent lamp.

26. A camera having an automatic emission function for causing flash means to automatically operate, comprising:
 a) light-source discriminating means for discriminating a kind of an artificial light source by examining an ambient light;
 b) a control circuit for detecting a luminance value of an object and, if the luminance value is lower than a predetermined value, enabling an emission of the flash means; and
 c) adjusting means for adjusting the predetermined value on the basis of which said control circuit enables the emission of the flash means, in accordance with a kind of the artificial light source discriminated by said light-source discriminating means.

27. A camera according to claim 26, wherein if said light-source discriminating means determines that the artificial light source is a light source having a first characteristic, said adjusting means sets the predetermined value to a high value with respect to a value which is set when the artificial light source is a light source other than the light source having the first characteristic.

28. A camera according to claim 26, wherein if said light-source discriminating means determines that the artificial light source is a light source having a second characteristic, said adjusting means sets the predetermined value to a low value with respect to a value which is set when the artificial light source is a light source other than the light source having the second characteristic.

29. A camera according to claim 27, wherein the artificial light source having the first characteristic is a fluorescent lamp.

30. A camera according to claim 28, wherein the artificial light source having the second characteristic is a tungsten light source.

31. A camera having an automatic emission function for causing flash means to automatically operate, comprising:
 a) light-source discriminating means for discriminating a kind of an ambient light source by examining an ambient light;
 b) a control circuit for detecting a luminance value of an object and, if the luminance value is lower than a predetermined value, enabling an emission of the flash means; and
 c) disabling means for disabling the flash means from operating, on the basis of a result of the discrimination made by said light-source discriminating means irrespective of the detected luminance value of the object.

32. A camera according to claim 31, wherein if said light-source discriminating means determines that the ambient light source is a light source having a first characteristic, said disabling means disables the flash means from operating.

33. A camera according to claim 32, wherein the light source having the first characteristic is a tungsten light source.

34. A camera according to claim 31, further comprising adjusting means for adjusting, in accordance with a result of the discrimination made by said light-source discriminating means, the predetermined value on the basis of which said control means enables the emission of the flash means.

35. A camera according to claim 32, further comprising adjusting means for setting, if said light-source discriminating means determines that the ambient light source is a light source having a second characteristic, the predetermined value to a high value with respect to a value which is set when the ambient light source is a light source other than the light source having the second characteristic.

36. A camera according to claim 35, wherein the light source having the first characteristic is a tungsten light source, while the light source having the second characteristic is a fluorescent lamp.

37. A device for causing flash tube to automatically operate, comprising:
 a) light-source discriminating circuit which discriminates a kind of an ambient light source by examining an ambient light;
 b) a control circuit which detects a luminance value of an object and, if the luminance value is lower than a predetermined value, enabling an emission of the flash tube;
 c) disabling circuit which disables the flash tube from operating, on the basis of a result of the discrimination made by said light-source discriminating circuit irrespective of the luminance value of the object.

38. A device according to claim 37, wherein if said light-source discriminating circuit determines that the ambient light source is a light source having a first characteristic, said disabling circuit disables the flash tube from operating.

39. A device according to claim 38, wherein the light source having the first characteristic is a tungsten light source.

40. A device according to claim 38, further comprising adjusting circuit which sets, if said light-source discriminating circuit determines that the ambient light source is a light source having a second characteristic, the predetermined value to a high value with respect to a value which is set when the ambient light source is a light source other than the light source having the second characteristic.

41. A device according to claim 40, wherein the light source having the first characteristic is a tungsten light source, while the light source having the second characteristic is a fluoroescent lamp.

42. A device for causing flash tube to automatically operate, comprising:
 a) light source discriminating circuit which discriminates a kind of an ambient light source by examining an ambient light;
 b) a control circuit which detects a luminance value of an object and, if the luminance value is lower than a predetermined value, enables an emission of the flash tube; and
 c) adjusting circuit which adjusts the predetermined value on the basis of which said control circuit enables the emission of the flash tube, in accordance with a kind of the light source discriminated by said light-source discrimination circuit.

43. A device according to claim 42, wherein if said light-source discriminating circuit determines that the light source is a light source having a first characteristic, said adjusting circuit sets the predetermined value to a high value with respect to a value which is set when the light source is a light source other than the light source having the first characteristic.

44. A device according to claim 42, wherein if said light-source discriminating circuit determines that the light source is a light source having a second characteristic, said adjusting circuit sets the predetermined value to a low value with respect to a value which is set when the light source is a light source other than the light source having the second characteristic.

45. A device according to claim 43, wherein the light source having the first characteristic is a fluoroescent lamp.

46. A device according to claim 44, wherein the light source having the second characteristic is a tungsten light source.

* * * * *